United States Patent
Gamper et al.

(10) Patent No.: US 10,028,070 B1
(45) Date of Patent: Jul. 17, 2018

(54) SYSTEMS AND METHODS FOR HRTF PERSONALIZATION

(71) Applicant: Microsoft Technology Licensing, LLC, Redmond, WA (US)

(72) Inventors: Hannes Gamper, Cambridge (GB); David Johnston, Bellevue, WA (US); Ivan Tashev, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/627,849

(22) Filed: Jun. 20, 2017

Related U.S. Application Data

(60) Provisional application No. 62/467,446, filed on Mar. 6, 2017.

(51) Int. Cl.
*H04S 7/00* (2006.01)
*G06K 9/00* (2006.01)

(52) U.S. Cl.
CPC .......... *H04S 7/302* (2013.01); *G06K 9/00268* (2013.01); *H04S 2400/11* (2013.01); *H04S 2420/01* (2013.01)

(58) Field of Classification Search
CPC .. H04S 7/302; H04S 2400/11; H04S 2420/01; G06K 9/00268
See application file for complete search history.

(56) References Cited

U.S. PATENT DOCUMENTS

| | | | |
|---|---|---|---|
| 4,325,381 A | 4/1982 | Glenn | |
| 6,996,244 B1 | 2/2006 | Slaney et al. | |
| 7,234,812 B2 | 6/2007 | Piorkowski et al. | |
| 8,014,532 B2 | 9/2011 | Bruno | |
| 8,270,616 B2 | 9/2012 | Slamka et al. | |
| 8,767,968 B2 | 7/2014 | Flaks et al. | |
| 8,787,584 B2 | 7/2014 | Nystrom et al. | |
| 9,236,024 B2 | 1/2016 | Coon | |
| 9,544,706 B1 | 1/2017 | Hirst | |
| 9,615,190 B1 | 4/2017 | Norris | |
| 9,934,590 B1 | 4/2018 | Cheng | |
| 2003/0138107 A1 | 7/2003 | Jin et al. | |
| 2007/0183603 A1 | 8/2007 | Jin et al. | |
| 2009/0046864 A1 | 2/2009 | Mahabub et al. | |
| 2009/0238371 A1 | 9/2009 | Rumsey et al. | |
| 2010/0111370 A1 | 5/2010 | Black et al. | |
| 2012/0183161 A1 | 7/2012 | Agevik et al. | |

(Continued)

FOREIGN PATENT DOCUMENTS

| EP | 2611216 | 7/2013 |
|---|---|---|
| WO | WO 2013111038 | 8/2013 |

OTHER PUBLICATIONS

"Making immersive virtual reality possible in mobile", In White Paper of Qualcomm, Apr. 2016, pp. 1-51.

(Continued)

*Primary Examiner* — Mark Fischer

(57) ABSTRACT

Systems and methods for HRTF personalization are provided. More specifically, the systems and methods provide HRTF personalization for a user based on a depth image of the user. Accordingly, the provided systems and methods are less complicated, easier to use, and easier to implement for personalizing HRTFs when compared to previously utilized systems and methods that required high-resolution three-dimensional head scans or one or more specific and/or discrete anthropomorphic measurements of the user.

20 Claims, 12 Drawing Sheets

(56) References Cited

U.S. PATENT DOCUMENTS

| | | |
|---|---|---|
| 2012/0237041 A1 | 9/2012 | Pohle |
| 2012/0328107 A1 | 12/2012 | Nystrom et al. |
| 2013/0169779 A1 | 7/2013 | Pedersen |
| 2013/0194107 A1 | 8/2013 | Nagata |
| 2014/0355765 A1 | 12/2014 | Kulavik |
| 2015/0055937 A1 | 2/2015 | Van hoff et al. |
| 2015/0156599 A1 | 6/2015 | Romigh |
| 2015/0312694 A1 | 10/2015 | Bilinski et al. |
| 2016/0253675 A1 | 9/2016 | Remillet |
| 2017/0208413 A1 | 7/2017 | Bilinski et al. |
| 2017/0332186 A1 | 11/2017 | Riggs |

OTHER PUBLICATIONS

"Non-negative matrix factorization." Retrieved from Wikipedia on Mar. 26, 2014 at: http://en.wikipedia.org/wiki/Non-negative_matrix_factorization, 11 pages.
Aaronson, et al., "Testing, correcting, and extending the Woodworth model for interaural time difference", In the Journal of the Acoustical Society of America, vol. 135, No. 2, Feb. 2014, pp. 817-823.
Abramowitz, et al., "Handbook of mathematical functions, Courier Corporation", In Publication of Courier Corporation, Jun. 1994, 22 pages.
Ahrens et al., "HRTF magnitude modeling using a non-regularized least-squares fit of spherical harmonics coefficients on incomplete data", In Proceedings of Asia-Pacific Signal and Information Processing Association Annual Summit and Conference, Dec. 3, 2012, 5 pages.
Algazi et al, "The CIPIC HRTF Database", Proceedings of IEEE Workshop on the Applications of Signal Processing to Audio and Acoustics, Oct. 2001, 4 pages.
Algazi, et al., "Approximating the head-related transfer function using simple geometric models of the head and torso", In Journal of the Acoustical Society of America, vol. 112, Issue 5, Aug. 1, 2002, pp. 2053-2064.
Algazi, et al., "Estimation of a spherical-head model from anthropometry", In Journal of the Audio Engineering Society, vol. 49, No. 6, Jun. 2001, pp. 1-21.
Amberg, et al., "Optimal step nonrigid ICP algorithms for surface registration", In Proceedings of IEEE Conference on Computer Vision and Pattern Recognition, Jun. 17, 2007, 8 pages.
Andreopoulou, Areti, "Head-Related Transfer Function Database Matching Based on Sparse Impulse Response Measurements", New York University, 2013, 239 pgs.
Bilinski, "HRTF Personalization using Anthropometric Features", retrieved on Jul. 3, 2014 at «http://research.microsofl.com/apps/video/defaultaspx?id=201707», Microsoft Corporation, 2013, 1 page.
Bilinski, et al., "HRTF magnitude synthesis via sparse representation of anthropometric features", In Proceedings of IEEE International Conference on Acoustics, Speech and Signal Processing, May 4, 2014, 5 pages.
Bosun et al., "Head-related transfer function database and its analyses", Proceedings of Science in China Series G: Physics, Mechanics & Astronomy, vol. 50, No. 3, Jun. 2007, 14 pages.
Constan, Zachary et al., "On the detection of dispersion in the head-related transfer function", In Journal of Acoustical Society of America, vol. 114, Issue 2, Aug. 2003, pp. 998-1008.
Donoho, "For Most Large Underdetermined Systems of Linear Equations of Minimal 11-Norm Solution is also the Sparsest Solution", Technical Report, Jul. 2004, 30 pages.
Duda, et al., "An adaptable ellipsoidal head model for the interaural time difference", In Proceedings of IEEE International Conference on Acoustics, Speech, and Signal Processing, Mar. 15, 1999, pp. 1-4.
Erturk, et al., "Efficient representation of 3D human head models", In Proceedings of the British Machine Vision Conference, Sep. 13, 1999, pp. 329-339.

Fink, et al., "Tuning principal component weights to individualize HRTFs", In Proceedings of IEEE International Conference on Acoustics, Speech and Signal Processing, Mar. 25, 2012, pp. 389-392.
Fliege, et al., "A two-stage approach for computing cubature formulae for the sphere", In Thesis of University of Dortmund, 1996, pp. 1-31.
Fliege, et al., "The distribution of points on the sphere and corresponding cubature formulae", In Journal of IMA Numerical Analysis, vol. 19, Issue 2, Apr. 1, 1999, pp. 317-334.
Funkhouser, et al., "A search engine for 3D models", In Journal ACM Transactions on Graphics, vol. 22, Issue 1, Jan. 2003, pp. 83-105.
Gamper, et al., "Anthropometric parameterisation of a spherical scatterer ITD model with arbitrary ear angles", In Proceedings of IEEE Workshop on Applications of Signal Processing to Audio and Acoustics, Oct. 18, 2015, 5 pages.
Gamper, et al., "Estimation of multipath propagation delays and interaural time differences from 3-D head scans", In Proceedings of IEEE International Conference on Acoustics, Speech and Signal Processing, Apr. 19, 2015, pp. 499-503.
Grijalva, et al., "Anthropometric-based customization of head-related transfer functions using Isomap in the horizontal plane", In Proceedings of IEEE International Conference on Acoustic, Speech and Signal Processing, May 4, 2014, 5 pages.
Grindlay et al., "A Multilenear Approach to HRF Personalization", Proceedings of 32nd International Conference on caustics, Speech, and Signal Processing, Apr. 2007, 4 pages.
Guillon, et al., "HRTF customization by frequency scaling and rotation shift based on a new morphological matching method", In Proceedings of 125th Convention of the AES, Oct. 1, 2008, 14 pages.
Haneda, et al., "Common-acoustical-pole and zero modeling of head-related transfer functions", In IEEE transactions on speech and audio processing, vol. 7, Issue 2, Mar. 1999, pp. 188-196.
Haraszy et al., "Improved Head Related Transfer Function Generation and Testing for Acoustic Virtual Reality Development" Proceedings of the 14th WSEAS International Conference on Systems: Part of the 14th WSEAS CSCC Multiconference, vol. 2, Jul. 2010, 6 pages.
Harma, et al., "Personalization of headphone spatialization based on the relative localization error in an auditory gaming interface", In AES 132nd Convention, Apr. 26, 2012, 8 pages.
Hastie, Trevor et al., "The Elements of Statistical Learning Data Mining, Inference, and Prediction", Springer New York, Sep. 15, 2009, pp. 139-189, 219-251, 485-579, and 649-694.
He, et al., "On the preprocessing and postprocessing of HRTF individualization based on sparse representation of anthropometric features", In Proceedings of IEEE International Conference on Acoustic, Speech and Signal Processing, Apr. 19, 2015, 6 pages.
Hertsens, Tyll, "AES Headphone Technology Conference: Head Related Transfer Function", In Audio Engineering Society Headphone Conference, Sep. 1, 2016, 11 pages.
Hoerl et al., "Ridge regression Biased estimation for Nonorthogonal Problems" Journal of Technometrics, vol. 42, Issue 1, Feb. 2000, 7 pages.
Hu et al., "HRTF personalization based on artificial neural network in individual virtual auditory space", In the Proceedings of the Journal of Applied Acoustics, vol. 69, Iss. 2, Feb. 2009, pp. 163-172.
Hu, et al., "HRTF personalization based on multiple regression analysis", In Proceedings of International Conference on Computational Intelligence and Security, vol. 2, Nov. 3, 2006, pp. 1829-1832.
Huang et al., "Sparse Representation for Signal Classification", Proceedings of Twenty-First Annual Conference on Neural Information Processing Systems, Dec. 2007, 8 pages.
Huang, Qing-hua, and Fang, Yong, "Modeling personalized head-related impulse response using support vector regression", J. Shanghai Univ, 2009, pp. 428-432.
Huttunen, et al., "Rapid generation of personalized HRTFs", In Proceedings of Audio Engineering Society Conference: 55th International Conference on Spatial Audio, Aug. 26, 2014, 6 pages.

(56) References Cited

OTHER PUBLICATIONS

Jin, et al., "Creating the Sydney York morphological and acoustic recordings of ears database", In Proceedings IEEE Transactions on Multimedia, vol. 16, Issue 1, Jan. 2014, pp. 37-46.

Jin, et al., "Enabling individualized virtual auditory space using morphological measurements", In Proceedings of the First IEEE Pacific-Rim Conference on Multimedia, Dec. 2000, 4 pages.

Kazhdan, et al., "Rotation invariant spherical harmonic representation of 3D shape descriptors", In Journal of Eurographics Symposium on Geometry Processing, vol. 6, Jun. 23, 2003, pp. 156-165.

Kohavi, "A Study of Cross-Validation and Bootstrap for Accuracy Estimation and Model Selection", Proceedings of the 14th International Joint Conference on Artificial Intelligence, vol. 2, Aug. 1995, 7 pages.

Kuhn, George F., "Model for the interaural time differences in the azimuthal plane", In the Journal of the Acoustical Society of America, vol. 62, No. 1, Jul. 1977, pp. 157-167.

Kukreja et al., "A Least Absolute Shrinkage and Selection Operator (Lasso) for Nonlinear System Identification", Proceedings NIA, Mar. 2014, 6 pages.

Kulkarni, et al., "Sensitivity of human subjects to head-related transfer-function phase spectra", In Journal of Acoustical Society of America, vol. 105, Issue 5, May 1999, pp. 2821-2840.

Lalwani, Mona, "3D audio is the secret to HoloLens' convincing holograms", published Feb. 11, 2016, 17 pgs.

Lemaire, Vincent, et al., "Individualized HRTFs From Few Measurements: a Statistical Learning Approach", IEEE (2005), pp. 2041-2046.

Li et al., "HRTF Personalization Modeling Based on RBF Neural Network", Proceedings of International Conference on Acoustics, Speech and Signal Proceeding, May 2013, 4 pages.

Luo et al., "Gaussian Process Data Fusion for the Heterogeneous HRTF Datasets", Proceedings of IEEE Workshop on Applications of Signal Processing to Audio and Acoustics, Oct. 2013, 4 pages.

McMullen, et al., "Subjective selection of HRTFs based on spectral coloration and interaural time difference cues", In Proceedings of AES 132rd Convention, Oct. 26, 2012, pp. 1-9.

Meshram, et al., "Efficient HRTF Computation using Adaptive Rectangular ecomposition", In Proceedings of Audio Engineering Society Conference: 55th International Conference on Spatial Audio, Aug. 27, 2014, 9 pages.

Mohan et al., "Using Computer Vision to Generate Customized Spatial Audio", Proceedings of the International Conference on Multimedia and Expo, vol. 3, Jul. 2003, 4 pages.

Mokhtari, et al., "Computer simulation of HRTFs for personalization of 3D audio", In Proceedings of Second International Symposium on Universal Communication, Dec. 15, 2008, pp. 435-440.

Pei, et al., "3D rotation estimation using discrete spherical harmonic oscillator transforms", In Proceedings of IEEE International Conference on Acoustics, Speech and Signal Processing, May 5, 2014, 20 pages.

Pei, et al., "Discrete spherical harmonic oscillator transforms on the cartesian grids using transformation coefficients", In Journal of IEEE Transactions on Signal Processing, vol. 61, Issue 5, Mar. 1, 2013, pp. 1149-1164.

Rothbucher et al., "Measuring Anthropometric Data for HRTF Personalization" Sixth International Conference on Signal-Image Technology and Internet Based Systems, Dec. 2010, 5 pages.

Satarzadeh, et al., "Physical and filter pinna models based on anthropometry", In Proceedings of Presented at the 122nd Convention of Audio Engineering Society, May 5, 2007, pp. 1-21.

Schonstein et al., "HRTF Selection for Binaural Synthesis from a Database Using Morphological Parameters", Proceedings of 20th International Congress on Acoustics, Aug. 2010, 6 pages.

Spagnol et al., "On the Relation Between Pinna Reflection Patterns and Head-Related Transfer Function Features", Proceedings of IEEE Transactions on Audio, Speech, and Language Processing, vol. 21, Issue 3, Mar. 2013, 12 pages.

Sunder, et al., "Individualization of Head-Related Transfer Functions in the Median Plane using Frontal Projection Headphones", In Journal of Audio Engineering Society, vol. 64, No. 12, Dec. 27, 2016, 1 page.

Tashev, Ivan, "Audio challenges in virtual and augmented reality devices", In Proceedings of IEEE International Workshop on Acoustic Signal Enhancement, Sep. 15, 2016, pp. 1-44.

Tashev, Ivan, "HRTF phase synthesis via sparse representation of anthropometric features", In Proceedings of Information Theory and Applications, Feb. 9, 2014, 5 pages.

U.S. Appl. No. 14/265,154, Amendment and Response filed Dec. 9, 2016, 32 pgs.

U.S. Appl. No. 14/265,154, Amendment and Response filed Apr. 12, 2016, 29 pgs.

U.S. Appl. No. 14/265,154, Amendment and Response filed Jul. 7, 2017, 15 pgs.

U.S. Appl. No. 14/265,154, Office Action dated Feb. 1, 2016, 22 pgs.

U.S. Appl. No. 14/265,154, Office Action dated Apr. 7, 2017, 19 pgs.

U.S. Appl. No. 14/265,154, Office Action dated Sep. 9, 2016, 18 pgs.

Wagner et al., "Towards a Practical Face Recognition System: Robust Alignment and Illumination by Sparse Representation" Proceedings of IEEE Transactions on Pattern Analysis and Machine Intelligence, vol. 34, Issue 2, Feb. 2012, 15 pages.

Wahab et al., "Improved Method for Individualization of Head-Related Transfer Functions on Horizontal Plane Using Reduced Number of Anthropometric Measurements", Journal of Telecommunications, vol. 2, Issue 2, May 2010, 11 pages.

Wahab, et al., "The Effectiveness of Chosen Partial Anthropometric Measurements in Individualizing Head-Related Transfer Functions on Median Plane", In ITB Journal of Information and Communication Technology, vol. 5, Issue 1, May 2011, pp. 35-56.

Wang, et al., "Rotational invariance based on Fourier analysis in polar and spherical coordinates", In Journal of IEEE transactions on pattern analysis and machine intelligence, vol. 31, Issue 9, Sep. 2009, pp. 1715-1722.

Wightman, et al., "Factors affecting the relative salience of sound localization cues", In Publication of Psychology Press, 1997, 24 pgs.

Wright et al., "Robust Face Recognition via Sparse Representation", IEEE Transactions on Pattern Analysis and Machine Intelligence, vol. 31, No. 2, Feb. 2009, 18 pages.

Xu, et al., "Individualization of Head-Related Transfer Function for Three-Dimensional Virtual Auditory Display: A Review", In Proceedings of International Conference on Virtual Reality, Jul. 22, 2007, pp. 397-407.

Zeng, et al., "A hybrid algorithm for selecting HRTF based on similarity of anthropometric structures", In Journal of Sound and Vibration, vol. 329, Issue 19, Sep. 13, 2010, 14 pgs.

Zolfaghari, et al., "Large deformation diffeomorphic metric mapping and fast-multipole boundary element method provide new insights for binaural acoustics", In Proceedings of IEEE International Conference on Acoustics, Speech and Signal Processing, May 4-9, 2014, pp. 1-5.

Zollofer, et al., "Automatic Reconstruction of Personalized Avatars from 3D Face Scans", In Journal of Computer Animation and Virtual Worlds, vol. 22 Issue 2-3, Apr. 2011, 8 pages.

Zotkin et al., "HRTF Personalization Using Anthropometric Measurements", In the Proceedings of the 2003 IEEE Workshop on Applications of Signal Processing to Audio and Acoustics, Oct. 19, 2003, pp. 157-160.

Zotkin, et al., "Rendering localized spatial audio in a virtual auditory space", In Journal of IEEE Transactions on Multimedia, vol. 6, Issue 4, Aug. 2004, pp. 553-564.

Zotkin, et al., "Virtual audio system customization using visual matching of ear parameters", In Proceedings 16th International Conference on Pattern Recognition, Aug. 11, 2002, pp. 1003-1006.

U.S. Appl. No. 14/265,154, Notice of Allowance dated Jan. 23, 2018, 2 pgs.

U.S. Appl. No. 15/473,959, Office Action dated Feb. 27, 2018, 6 pages.

(56) References Cited

OTHER PUBLICATIONS

"HRTF personalization based on artificial neural network in individual virtual auditory space", science direct, www.sciencedirect.com/science/article/pii/S000368X07000965, 2 pgs.

Gilkey, Robert H., "Binaural and spatial hearing in real and virtual environments", Mahwah, NJ, Lawrence Erlbaum Associates, 1997, pp. 1-23.

U.S. Appl. No. 15/463,853, Office Action dated Dec. 12, 2017, 11 pages.

U.S. Appl. No. 14/265,154, Notice of Allowance dated Sep. 5, 2017, 8 pgs.

U.S. Appl. No. 15/463,853, Amendment and Response filed Mar. 21, 2018, 13 pages.

U.S. Appl. No. 15/463,853, Office Action dated Apr. 30, 2018, 15 pages.

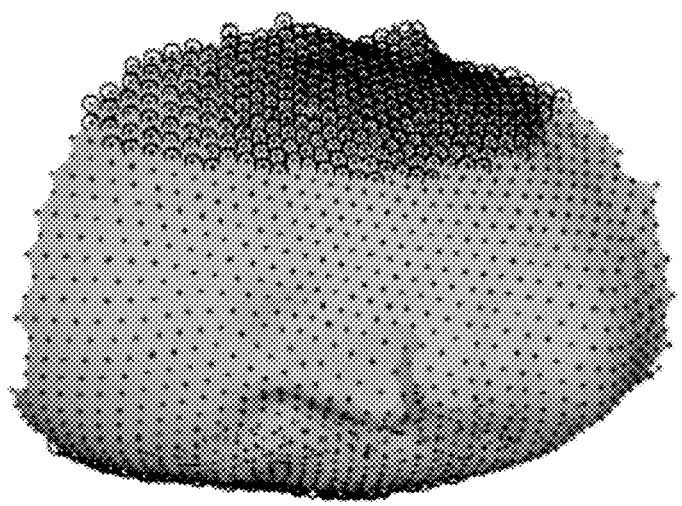
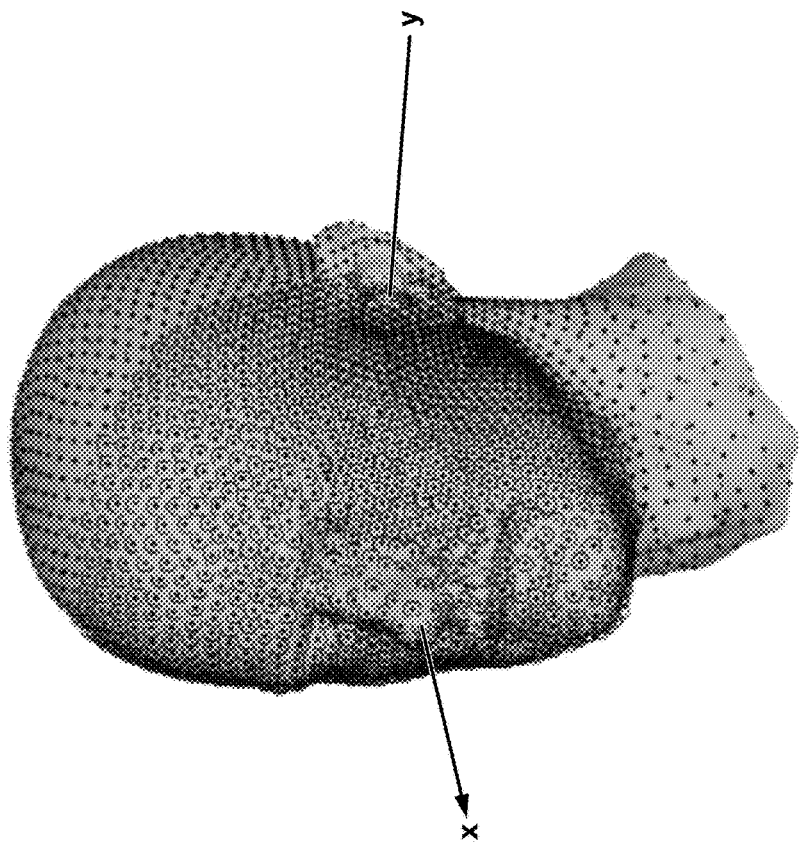
FIG. 3B
FIG. 3A

SYSTEMS AND METHODS FOR HRTF PERSONALIZATION

CROSS-REFERENCE TO RELATED APPLICATIONS

This application claims priority to and the benefit of U.S. Provisional Application Ser. No. 62/467,446, filed Mar. 6, 2017, entitled "SYSTEMS AND METHODS FOR HRTF PERSONALIZATION," which application is incorporated herein by reference in its entirety.

BACKGROUND

Head-related transfer functions (HRTFs) are acoustic transfer functions that describe the transfer of sound from a sound source position to the entrance of the ear canal of a human subject. HRTFs may be used to process a non-spatial audio signal to generate a HRTF-modified audio signal. The HRTF-modified audio signal may be played back over a pair of headphones that are placed over the ears of the human subject or speakers near the ears (e.g. HoloLens) to simulate sounds as coming from various arbitrary locations with respect to the ears of the human subject. Accordingly, HRTFs may be used for a variety of applications, such as 3-dimensional (3D) audio for games, live streaming of audio for events, music performances, audio for virtual reality, and/or other forms of audiovisual-based entertainment.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for HRTF personalization. More specifically, the systems and methods disclosed herein create a set of personalized HRTFs for a user based on a depth image of the user. As such, the systems and methods as disclosed herein are less complicated, easier to use, and easier to implement for personalizing HRTFs when compared to previously utilized HRTF personalization systems and methods.

One aspect of the disclosure is directed to a system for head-related transfer function (HRTF) personalization. The system includes at least one processor and a memory. The memory encodes computer executable instruction that, when executed by the at least one processor, are operative to:
collect a generic set of HRTFs;
collect a base three-dimensional face template;
collect a depth image of a face of a user;
bend the base three-dimensional face template until the base three-dimensional face template matches the face of the user in the depth image to form a modified three-dimensional face template;
calculate distortion parameters between the base three-dimensional face template and the modified three-dimensional face template;
adjust the generic set of HRTFs based on the distortion parameters to create a personalized set of HRTFs for the user; and
generate three-dimensional sound for the user based on the personalized set of HRTFs for the user.

In another aspect, method for head-related transfer function (HRTF) personalization is disclosed. The method includes:
collecting a generic set of HRTFs;
collecting a base three-dimensional face template;
collecting a depth image of a face of a user;
bending the base three-dimensional face template until the base three-dimensional face template matches the face of the user in the depth image to form a modified three-dimensional face template;
calculating distortion parameters between the base three-dimensional face template and the modified three-dimensional face template;
adjusting the generic set of HRTFs based on the distortion parameters to obtain a personalized set of HRTFs for the user; and
generating three-dimensional sound for the user based at least on the personalized set of HRTFs for the user.

In yet another aspect of the invention, the disclosure is directed to a head-related transfer function (HRTF) personalization. The system is a computing device that includes a processing unit and a memory. The computing device is operable to:
bend a base three-dimensional face template until the base three-dimensional face template matches a face of a user in a depth image to form a modified three-dimensional face template;
calculate one or more distortion parameters between the base three-dimensional face template and the modified three-dimensional face template; and
adjust a generic set of HRTFs based on the one or more distortion parameters to create a personalized set of HRTFs for the user.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

FIG. 3A is a high-resolution three-dimensional scan illustrating a 4096 uniformly distributed surface points (.) and 1583 face points (o), in accordance with aspects of the disclosure.

FIG. 3B is high-resolution three-dimensional scan illustrating a base three-dimensional face template generated based on 262 high-resolution 3-D head scans of different test subjects, in accordance with aspects of the disclosure.

DETAILED DESCRIPTION

Figure 1A:
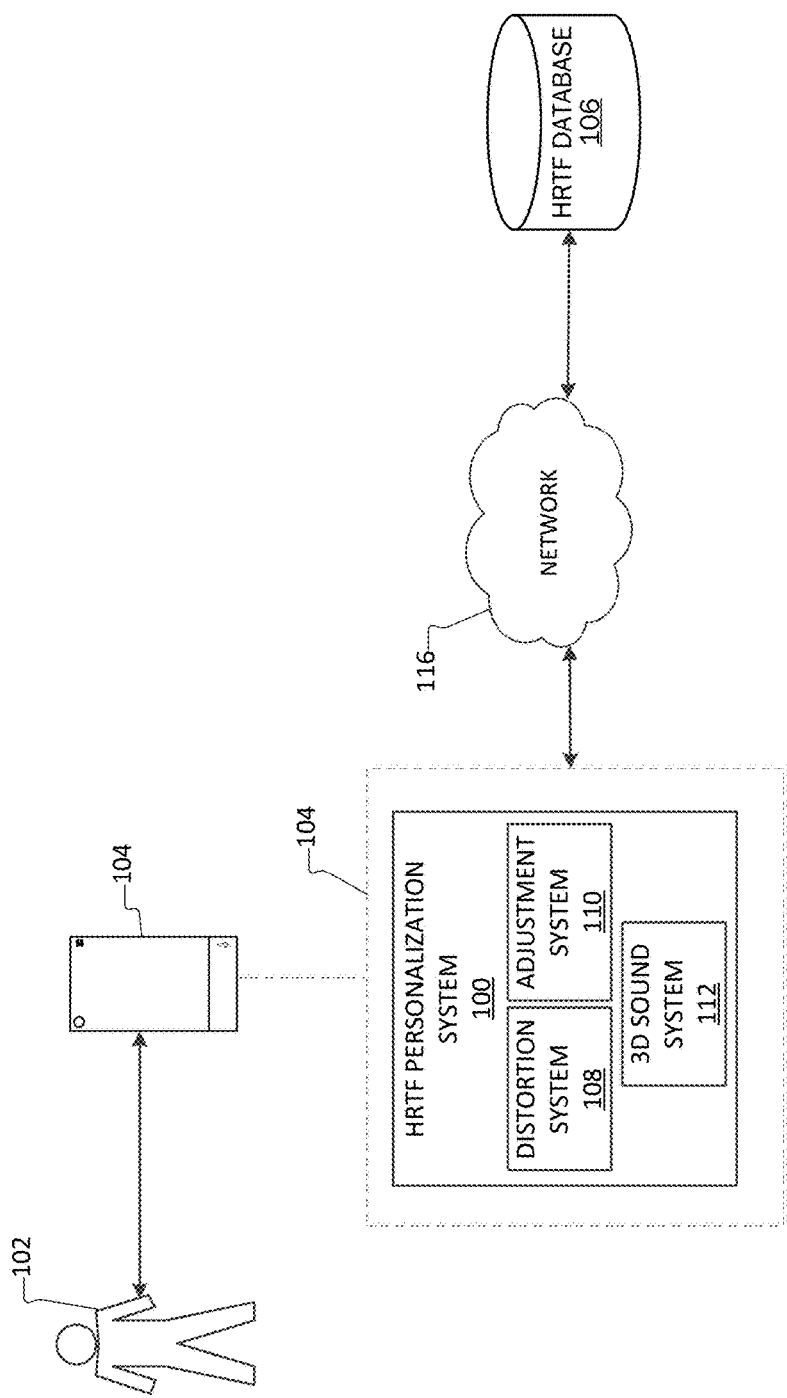
FIG. 1A is a schematic diagram illustrating a system for HRTF personalization being utilized by a user via a client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

As discussed above, HRTFs may be used to process a non-spatial audio signal to generate a HRTF-modified audio signal. The HRTF-modified audio signal may be played back over one or more speakers, such as a pair of headphones that are placed over the ears of the human subject, to simulate sounds as coming from various arbitrary locations with respect to the ears of the human subject. Accordingly, HRTFs may be used for a variety of applications, such as 3-dimensional (3D) audio for games, live streaming of audio for events, music performances, audio for virtual reality, and/or other forms of audiovisual-based entertainment.

However, due to anthropometric variability in human subjects, each human subject is likely to have a unique set of HRTFs. For example, the set of HRTFs for a human subject may be affected by anthropometric features, such as the circumference of the head, the distance between the ears, neck length, etc., of the human subject. Accordingly, the HRTFs for a human subject are generally measured under anechoic conditions using specialized acoustic measuring equipment, such that the complex interactions between direction, elevation, distance and frequency with respect to the sound source and the ears of the human subject may be captured in the functions. Such measurements may be time consuming and/or expensive to perform. Further, the use of specialized acoustic measuring equipment under anechoic conditions means that the measurement of personalized HRTFs for a large number of human subjects may be difficult or impractical.

When using a set of generic HRTFs for spatial sound rendering, personalization is utilized to minimize localization errors. The personalization involves tuning the characteristics of a generic set of HRTFs or a parametric model accordingly to the listener's anthropometry. A generic set of HRTFs is a set of HRTFs that is not specific for any person and instead is designed based on several different subjects' HRTFs. In some aspects, the generic set of HRTFs is derived from a database of HRTF sets measured from a plurality of training subjects.

An important cue encoded in the HRTF is the interaural time difference (ITD), which is the difference in times of arrival of a sound at both ears. The ITD is a function of the sound's direction of arrival as well as the listener's anthropometry. The human auditory system relies on the ITD as a major localization cue. Precise ITD modelling is important for accurate spatial rendering. Commonly utilized geometric ITD models include the Woodworth model and the spherical scatterer model. Both models approximate the head as a rigid sphere. These models have been extended to arbitrary ear angles and ellipsoidal head shapes.

Previously utilized systems and methods have tried to simplify the personalization of the HRTFs for each user by using high-resolution three-dimensional head scans to estimate the ITDs of the user or by taking one or more specific and/or discrete manual anthropomorphic measurements of the user to estimate the ITDs of the user. While these previously utilized systems and methods do not require the use of specialized acoustic measuring equipment under anechoic conditions, these measurements and scans are still difficult to obtain from a large number of users. For example, most users do not have a high-resolution three-dimension head scanner or know the anthropomorphic measurement of their facial features.

The systems and methods as disclosed herein are directed to HRTF personalization. The systems and methods for HRTF personalization as disclosed herein create a personalized set of HRTFs for a user utilizing a depth image of the user. The ability of the systems and methods described herein to create a personalized set of HRTFs for a user utilizing a depth image of the user provides for a less complicated, easier to use, and easier to implement system and/or method for personalizing HRTFs when compared to previously utilized systems and methods that require high-resolution three-dimensional head scans or one or more specific and/or discrete anthropomorphic measurements of the user.

FIGS. 1A-1D illustrate different examples of a HRTF personalization system 100 being utilized by a user 102 via a client computing device 104, in accordance with aspects of the disclosure. The HRTF personalization system 100 creates a personalized set of HRTFs for the user 102 based on a depth image 103 of a face of the user 102.

Figure 1B:
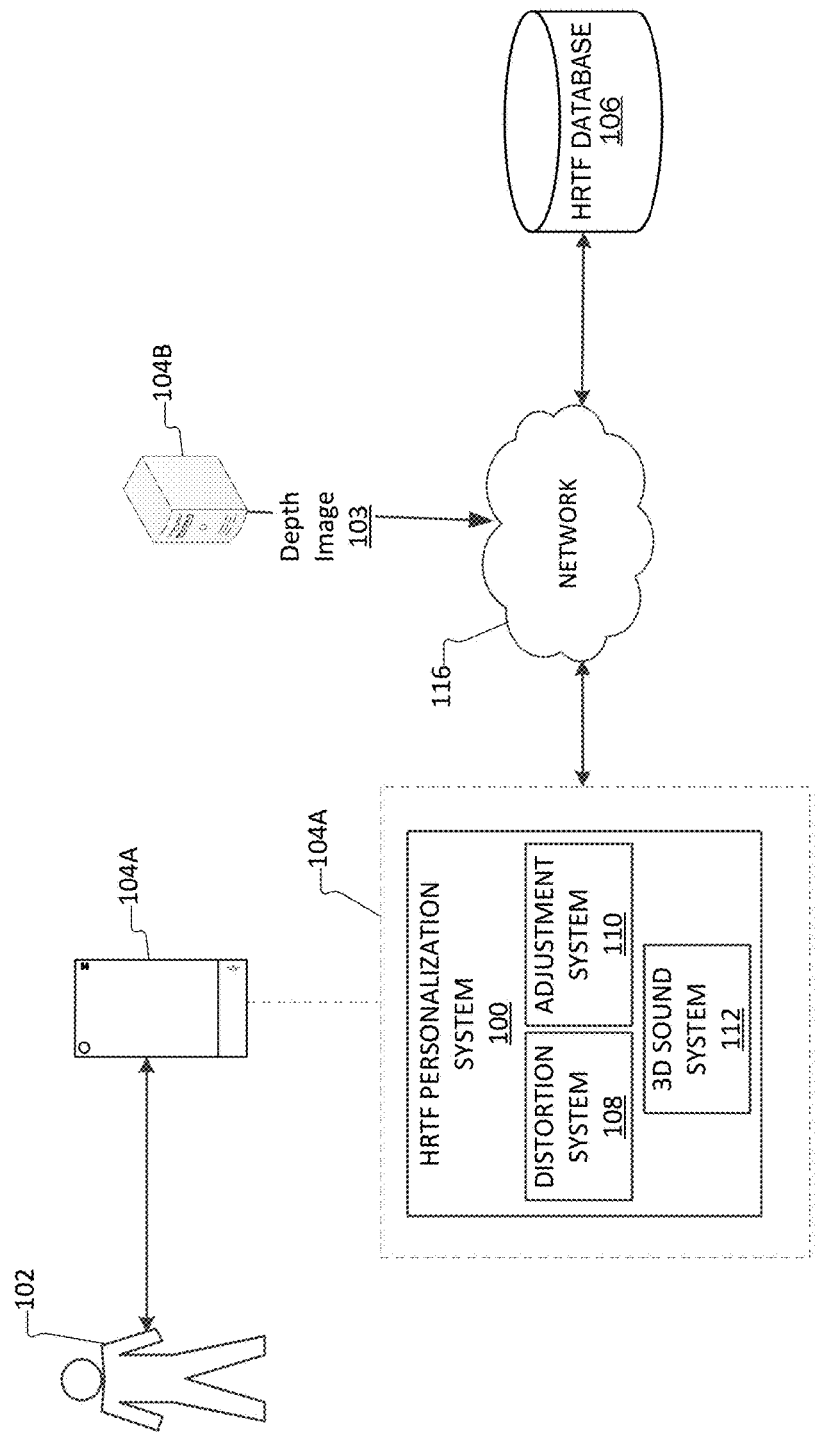
FIG. 1B is a schematic diagram illustrating a system for HRTF personalization being utilized by a user via a client computing device, in accordance with aspects of the disclosure.
Figure 1C:
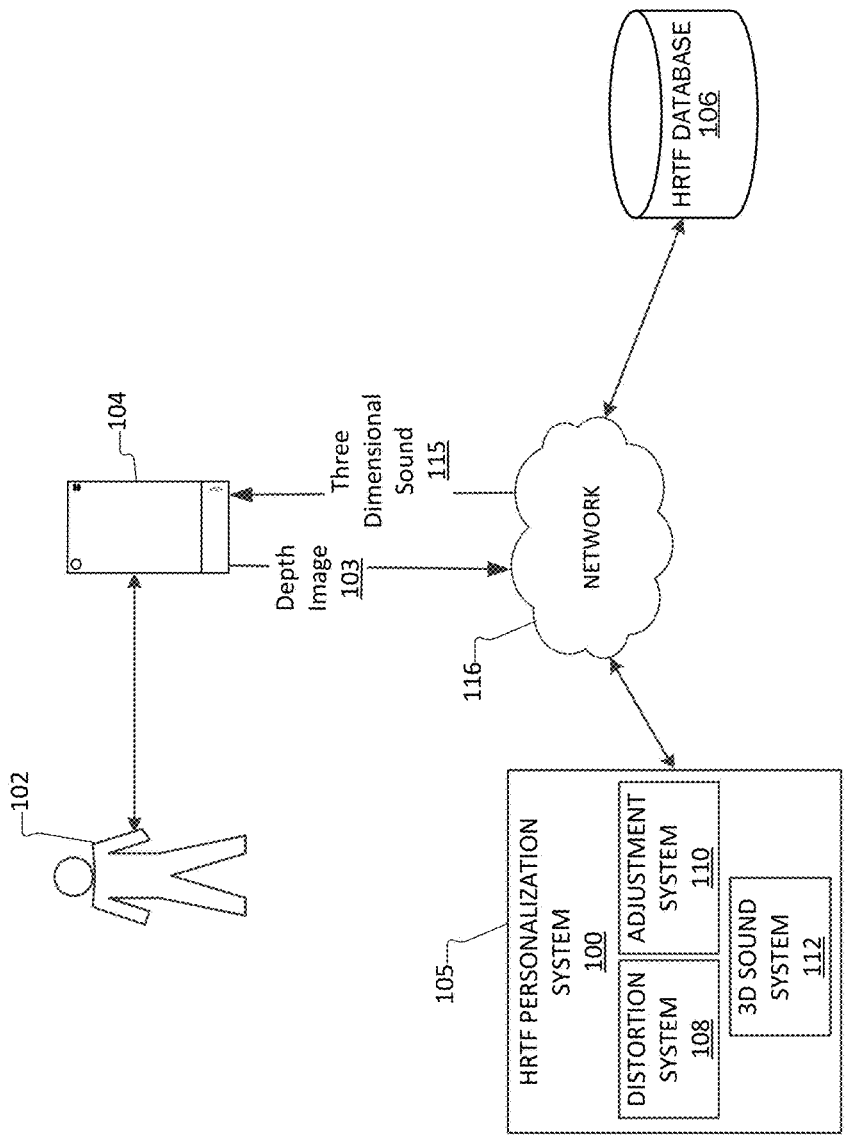
FIG. 1C is a schematic diagram illustrating a system for HRTF personalization being utilized by a user via a client computing device, in accordance with aspects of the disclosure.

The HRTF personalization system 100 may include a distortion system 108, an adjustment system 110, and/or a three-dimensional sound system 112, as illustrated in FIGS. 1A-1D. In some aspects, the HRTF personalization system 100 includes an HRTF database 106. In other aspects, the HRTF personalization system 100 communicates via a network 116 with a HRTF database 106 that is separate and distinct form the HRTF personalization system 100, as illustrated in FIGS. 1A-1C. In some aspects, the HRTF database 106 includes one or more databases 106. As such, the distortion system 108, an adjustment system 110, a three-dimensional sound system 112 and/or HRTF database 106 may communicate between each other.

In some aspects, the HRTF personalization system 100 is implemented on the client computing device 104, as illustrated by FIGS. 1A-1B. In a basic configuration, the client computing device 104 is a computer having both input elements and output elements. The client computing device 104 may be any suitable computing device for implementing the HRTF personalization system 100. For example, the client computing device 104 may be a mobile telephone, a smart phone, a tablet, a phablet, a smart watch, a wearable computer, a personal computer, a gaming system, a desktop computer, a laptop computer, a holographic device, a virtual reality system, and/or etc. This list is exemplary only and should not be considered as limiting. Any suitable client computing device 104 for implementing the HRTF personalization system 100 may be utilized.

Figure 1D:
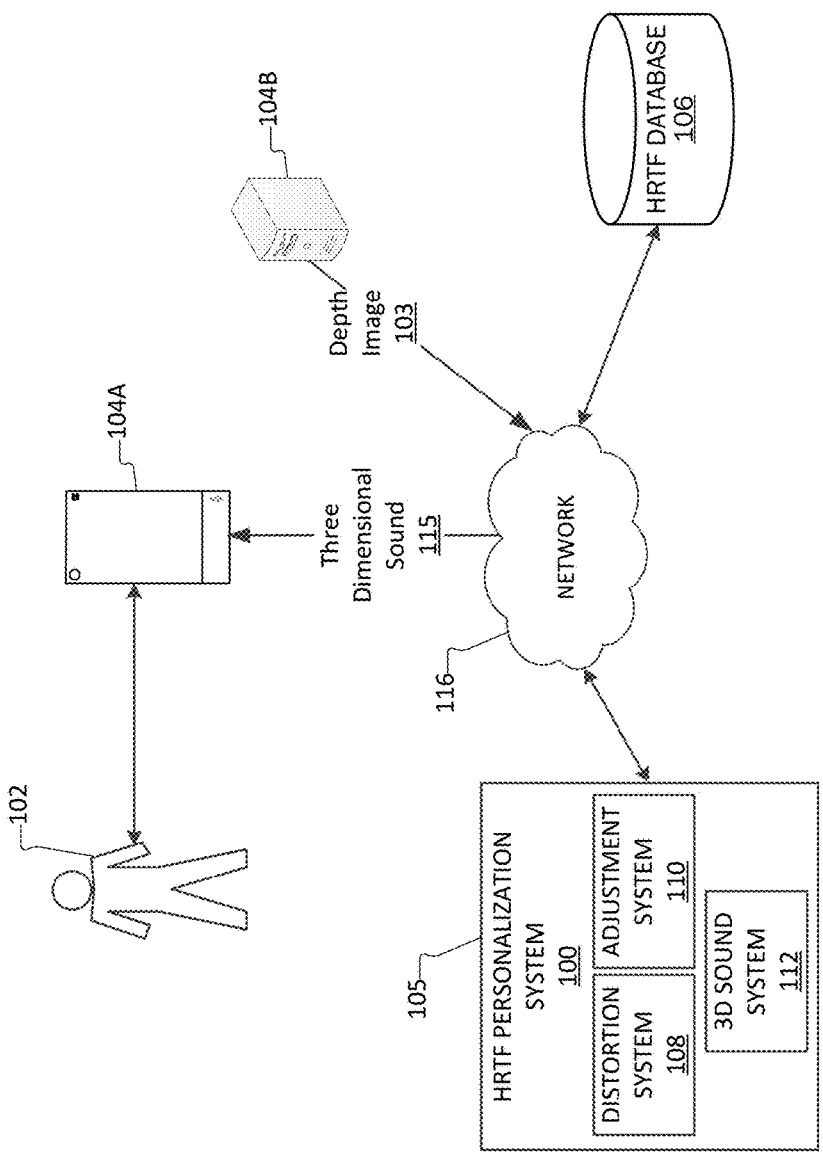
FIG. 1D is a schematic diagram illustrating a system for HRTF personalization being utilized by a user via a client computing device, in accordance with aspects of the disclosure.

In other aspects, the HRTF personalization system 100 is implemented on a server computing device 105, as illustrated in FIGS. 1C-1D. The server computing device 105 may provide data to and/or receive data from the client computing device 104 through a network 116. In some aspects, the network 116 is a distributed computing network, such as the Internet. In further aspects, the HRTF personalization system 100 is implemented on more than one server computing device 105, such as a plurality or network of server computing devices 105. For example, the distortion system 108 may be located on the same server computing device 105 as the adjustment system 110, as illustrated in FIGS. 1C-1D, or may be located on separate server computing devices 105. In some aspects, the HRTF personalization system 100 is a hybrid system with portions of the HRTF personalization system 100 on the client computing device 104 and with portions of the HRTF personalization system 100 on one or more server computing devices 105.

Several different types of client computing devices 104 are currently capable of taking depth images 103, such as holographic devices, gaming systems, etc. For example, Kinect™ for different gaming devices is capable of taking and obtaining depth images of a user 102. As such, the client computing device 104 may have one or more depth images 103 of a face of the user 102. In some aspects, the depth image 103 may be a single depth image 103 of the face of the user 102. In other aspects, the depth image may be obtained from a stereo camera. In other aspects, the depth image 103 includes a plurality of depth images of the face of the user 102. In further aspects, the user 102 may be associated with a plurality of client computing devices 104. In these aspects, the depth image 103 may be received from a client computing 104B that is separate and distinct from the client computing device 104A that utilizes the HRTF personalization system 100 and/or received 3D sound from the HRTF personalization system 100 as illustrated in FIGS. 1B and 1D. The HRTF personalization system 100 collects the one or more depth images 103 of the face of the user 102. The term "collect" as utilized herein refers to the active retrieval of information and/or to the passive receiving of information. In some aspects, the HRTF personalization system 100 sends instructions to or instructs the client computing device 104 to collect a face depth image 103 of the user 102. In these embodiments, the client computing device 104 requests that the user 102 pose for depth image 103 of his or her face.

In some aspects, the HRTF personalization system 100 collects a base set of HRTFs or a generic set of HRTFs for spatial sound rendering. In some aspects the HRTF personalization system 100 collects a generic set of HRTFs for spatial sound rendering from a HRTF database 106. In other aspects, the HRTF personalization system 100 determines or derives a generic set of HRTFs for spatial sound rendering.

The generic set of HRTFs may be generated by any known systems or methods for creating a generic set of HRFTs. For example, the generic set of HRTFs may be computed by averaging the HRTFs of known training subjects. For example, the generic set of HRTFs may be based on absolute ITD values averaged across a plurality training subjects.

In some aspects, the HRTF personalization system 100 also collects a base three-dimensional (3D) face template. While the base 3D face template and the depth image 103 refer to the face, the 3D face template and/or the depth image 103 of the face may include other areas of the head, neck, and/or shoulder regions of the user 102 and/or training subjects. In some aspects, the HRTF personalization system 100 collects a base 3D face template from a HRTF database 106. In other aspects, the HRTF personalization system 100 determines the base 3D face template. The base 3D face template may be created or derived by any suitable system or method as known by a person of skill in the art. The face template may be obtained or created by utilizing a database of 3D head scans from different training subjects. For example, an average face template may be derived from a database of 3D head scans from different training subjects. EXAMPLE 1 below illustrates an aspect for obtaining or creating a base 3D face template. In further aspects, the base 3D face template may be created or derived by averaging surface points and/or face points on the 3D head scans from different training subjects.

The distortion system 108 of the HRTF personalization system 100 collects the depth image 103 of the face of the user 102 and the base 3D face template. The distortion system 108 bends the base 3D face template until the base 3D face template matches the face of the user 102 in the depth image 103 to form a modified 3D face template. In some aspects, the distortion system 108 places a set of semi-uniformly distributed face and/or cheek points on the depth image 103 of the user 102. The set of semi-uniformly distributed face and/or cheek points placed on the depth image 103 of the user 102 may correspond to distributed face and/or cheek points on the base 3D face template. Next, in these aspects, the face of the user 102 in the depth image 103 is aligned with the base 3D face template by performing an iterative closest point transform. In these aspects, after alignment, the distortion system 108 bends or matches the base 3D face template until the face and/or cheek points on the base 3D face template match the face and/or cheek points on the depth image 103 of the face of the user 102. The face and/or cheek points may be matched or bent utilizing a non-rigid iterative closest point algorithm by distortion system 108.

Next, the distortion system 108 calculates or determines one or more distortion parameters between the base 3D face template and the modified 3D face template. In some aspects, the one or more distortion parameters are based on the difference in position of face and/or cheek points on the base 3D face template and the modified 3D face template. For example, the one or more distortion parameters may be calculated by comparing the y-coordinates of face and/or cheek points in the base 3D face template and in modified 3D face template. EXAMPLE 2 below provides one aspect for calculating one or more distortion parameters. In some aspects, the one or more distortion parameters are calculated based on the distortion between each common and/or known face point on the base three-dimensional face template and the modified three-dimensional face template.

The one or more distortion parameters are mapped to HRTF features. In some aspects, the distortion parameters are mapped to the HRTF features by linear regression, using ground-truth measured HRTFs with corresponding three-dimensional head scans to the ground-truth measured HRTFs. In some aspects, the distortion system 108 collects the 3D head scans and derives the ground-truth measured HRTFs from the 3D head scans. In other aspects, the distortion system 108 collects the ground-truth measured HRTFs and/or the corresponding high-resolution 3D head scans from a database. In some aspects, the 3D head scans are high-resolution 3D head scans. For example, solving EQUATION #7 as listed below in EXAMPLE 2 requires performing a linear regression over "true" scaling factors obtained via EQUATION #11 as listed below in EXAMPLE 4 and the distortion of the base 3D face template to match the corresponding 3D head scans.

The adjustment system 110 of the HRTF personalization system 100 collects the one or more distortion parameters. The adjustment system 110 also collects the generic set of HRTFs. The adjustment system 110 adjusts the generic set of HRTFs based on the one or more distortion parameters to create or form a personalized set of HRTFs for the user. In some aspects, the adjustment system 110 adjusts interaural time differences of the generic set of HRTFs based on the one or more distortion parameters to create or form the personalized set of HRTFs for the user.

In some aspects, the HRTF personalization system 100 includes a three-dimensional (3D) sound system 112. The 3D sound system 112 of the HRTF personalization system 100 collects the personalized set of HRTFs for the user 102. The 3D sound system 112 generates a 3D sound for the user 102 based on the personalized set of HRTFs for the user 102. The 3D sound system 112 may provide the 3D sound to the user 102. In some aspects, the 3D sound system 112 sends the 3D sound to a client computing device 104 to provide the sound to the user 102 via one or more speakers of client computing device 104. In other aspects, the 3D sound system 112 provides the 3D sound to the user 102 via one or more standalone speakers. The one or more speakers may be located on any suitable device for providing sound to the user 102, such as the client computing device 104, head phones, ear buds, wireless speakers, etc.

Experimental results show that the HRTF personalization system 100 performs comparably to using manually measured anthropometric features and is relatively robust even when used with incomplete head scans. As such, the HRTF personalization system 100 provides an easier implementation system for personalizing the HRTFs of different users than previously utilized HRTF personalization systems that required high-resolution 3D head scans or manual measurements of anthropometric features. While the HRTF personalization system 100 is discussed above with regards to a depth image 103 of a face of the user 102, a 3D head scan of the user 102 could be substituted for the depth image 103 in the HRTF personalization system 100 and could also work effectively.

Figure 4:
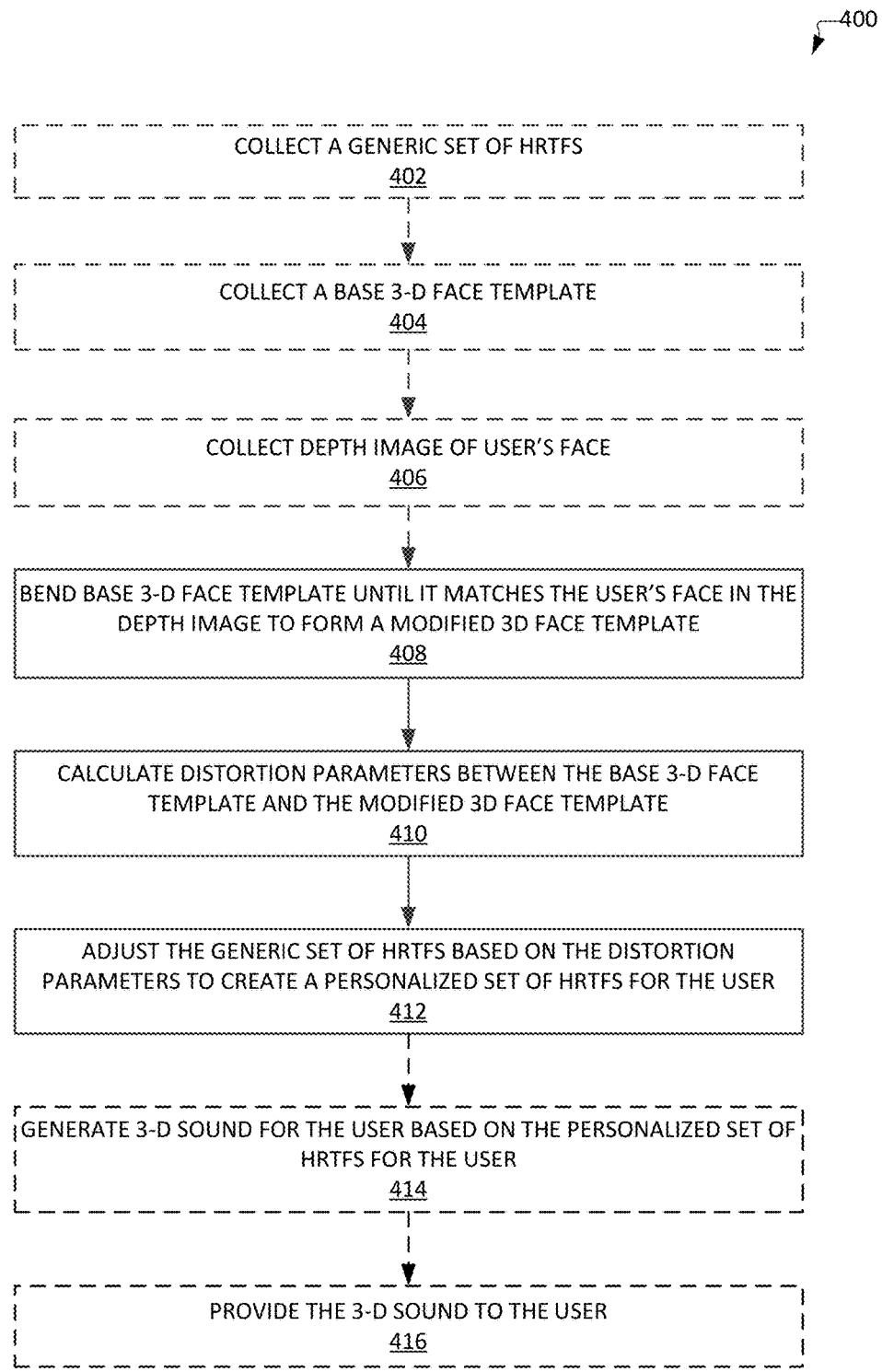
FIG. 4 is block flow diagram illustrating a method for HRTF personalization, in accordance with aspects of the disclosure.

FIG. 4 illustrates a flow diagram conceptually illustrating an example of a method 400 for personalizing HRTFs. Method 400 generates a personalized HRTF for the user 102 based on a depth image 103 of the face of the user 102.

In some aspects, method 400 includes operations 402, 404, and/or 406. In other aspects, method 400 does not include operations 402, 404, and/or 406. While operations 402, 404, and/or 406 are listed in a given order, these operations may be performed in any order as desired. As such, in some aspects, the method 400 starts at operation 402, 404, 406, or 408.

At optional operation 402, a generic set of HRTFs is collected. In some aspects, the generic set of HRTFs may be collected from a HRFT database at operation 402. In other aspects, the generic set of HRTFs are calculated or derived at operation 402 based on HRTFs from a database of training subjects.

At optional operation 404, a base 3D face template is collected. In some aspects, the base 3D face template may be collected from a HRFT database at operation 404. In other aspects, the base 3D face template is calculated or derived at operation 404 based on 3D head scans from a database of training subjects.

Method 400 also includes optional operation 406. At operation 406 a depth image of a user's face is collected. The depth image may be a single depth image or may be a plurality of depth images of the user's face. In some aspects, the depth image is collected by taking a depth image of the face of the user at operation 406. In other aspects, the depth image is collected by receiving or retrieving the depth image from storage on a client computing device.

At operation 408, the base 3D face template is bent until the base 3D face template matches the face of the user in the depth image to form a modified 3D face template. In some aspects, the face of the user in the depth image is aligned with the face template by performing an iterative closest point transform at operation 408. In these aspects, after alignment, the base 3D face template is bent or distorted until face and/or cheek points on the base 3D face template match corresponding known face and/or cheek points on the depth image of the face of the user at operation 408. In these aspects, the face and/or cheek points may be matched or bent utilizing a non-rigid iterative closest point algorithm at operation 408.

Next, operation 410 is performed. At operation 410, one or more distortion parameters between the base 3D face template and the modified 3D face template are calculated. In some aspects, the distortion parameters are mapped to HRTF features. In further aspects, the distortion parameters are mapped to the HRTF features by linear regression, using ground-truth measured HRTFs with corresponding three-dimensional head scans to the ground-truth measured HRTFs at operation 410. In some aspects the 3D head scans are collected from a database and the ground-truth measured HRTFs are derived from the 3D head scans at operation 410. In other aspects, the ground-truth measured HRTFs and/or the corresponding high-resolution 3D head scans are collected from a database at operation 410.

The generic set of HRTFs are adjusted based on the one or more distortion parameters calculated at operation 410 to create or form a personalized set of HRTFs for the user at operation 412. In some aspects, the HRTFs are adjusted by modifying or adjusting the interaural time difference of the base set of HRTFs.

In some aspects, method 400 includes operations 414 and/or 416. In other aspects, method 400 does not include operations 414 and/or 416. At optional operation 414, a 3D sound for the user is generated based on the personalized set of HRTFs for the user or instructions are sent to a client computing device on how to generate the 3D sound for the user. At operation 416, the 3D sound generated at operation 414 is provided to the user or instructions are generated and sent to a client computing device to provide the generated 3D sound to the user. In some aspects, the 3D sound is provided to the user via one or more speakers associated with the client computing device. In further, aspects, the one or more speaker may be part of any suitable device, such as a client computing device, headphones, portable speaker, ear buds, etc.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
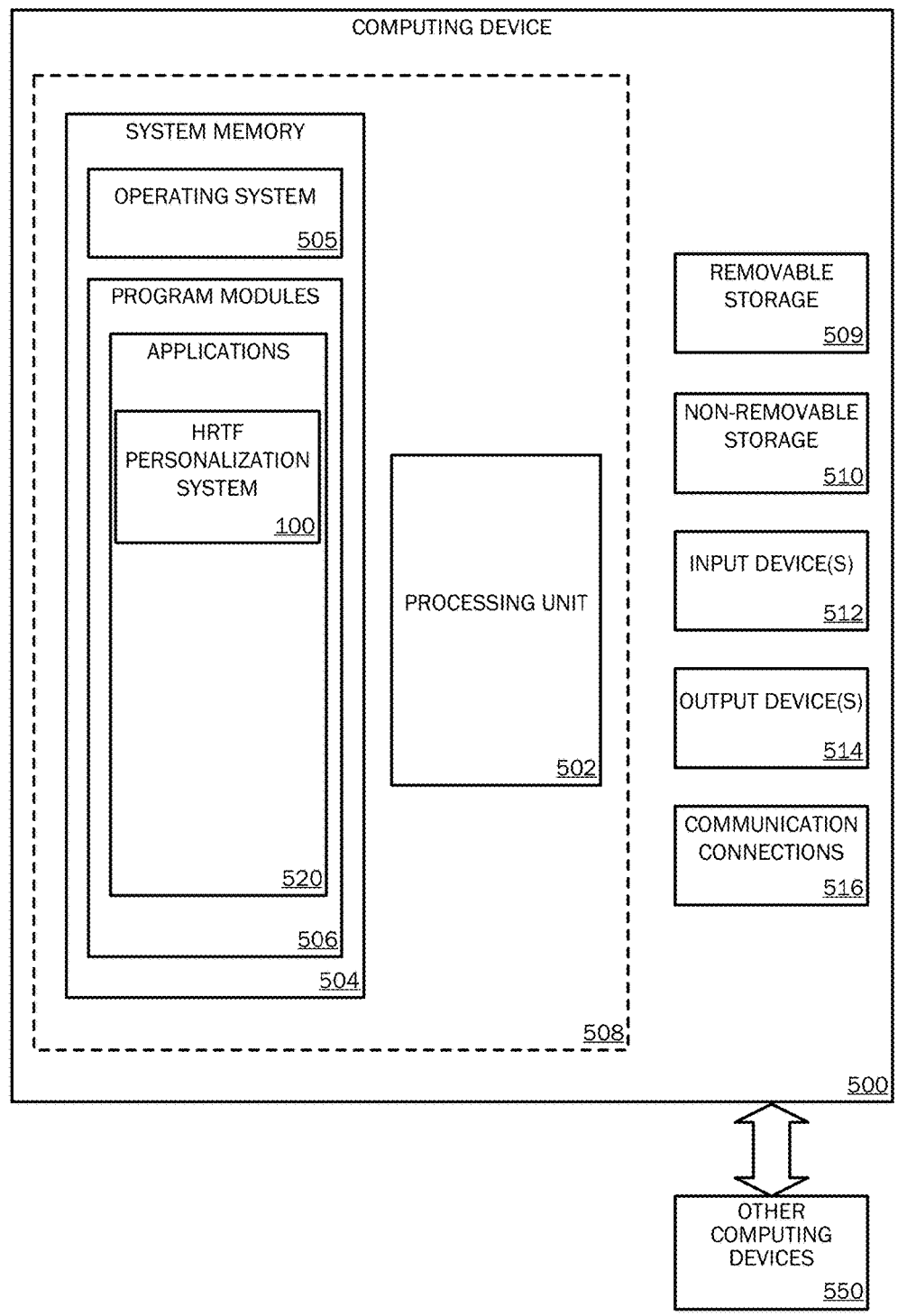
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the HRTF personalization system 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the HRTF personalization system 100 that can be executed to employ method 400 as disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., HRTF personalization system 100) may perform processes including, but not limited to, performing method 400 as described herein. For example, the processing unit 502 may implement the HRTF personalization system 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
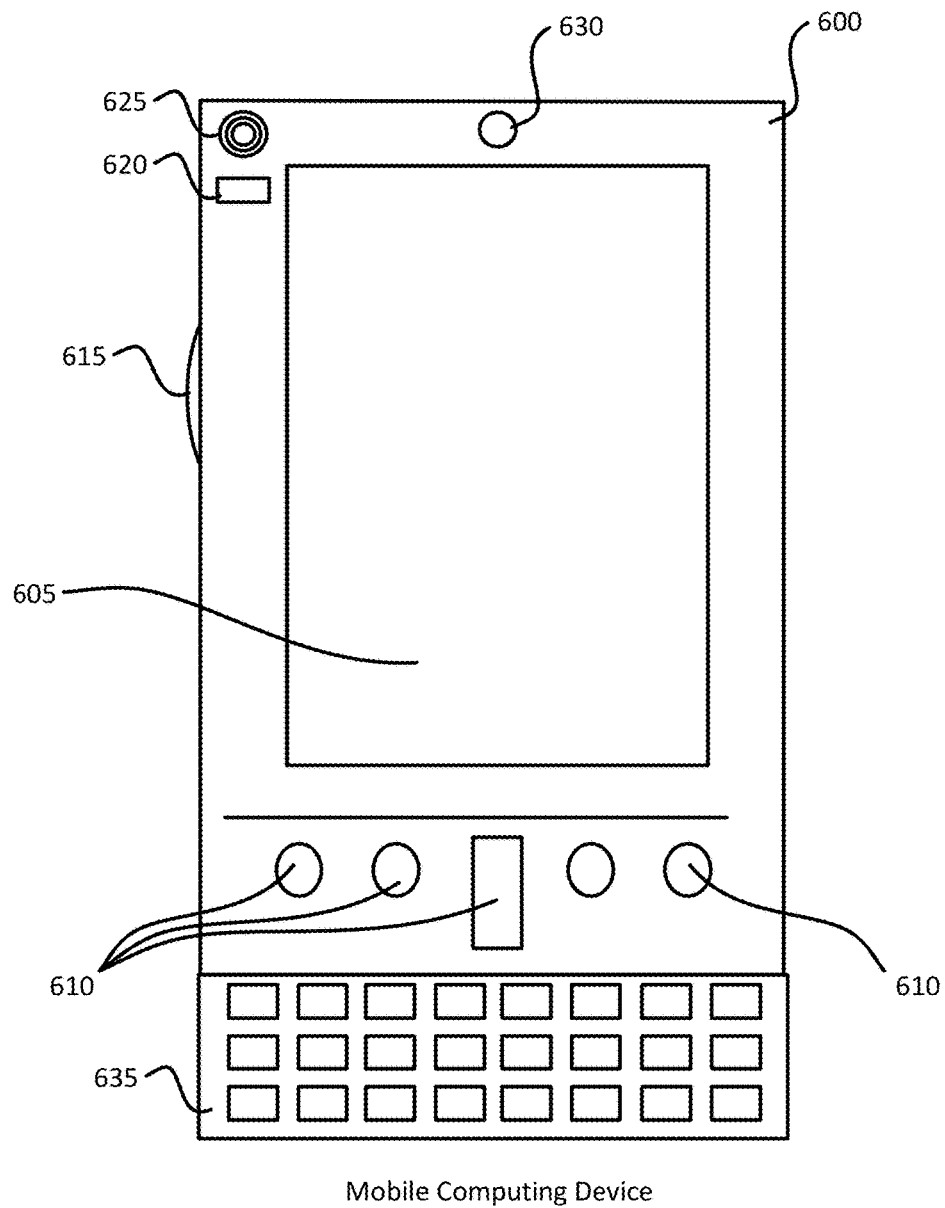
FIG. 6A is a simplified block diagram of a mobile computing device with which various aspects of the disclosure may be practiced.
Figure 6B:
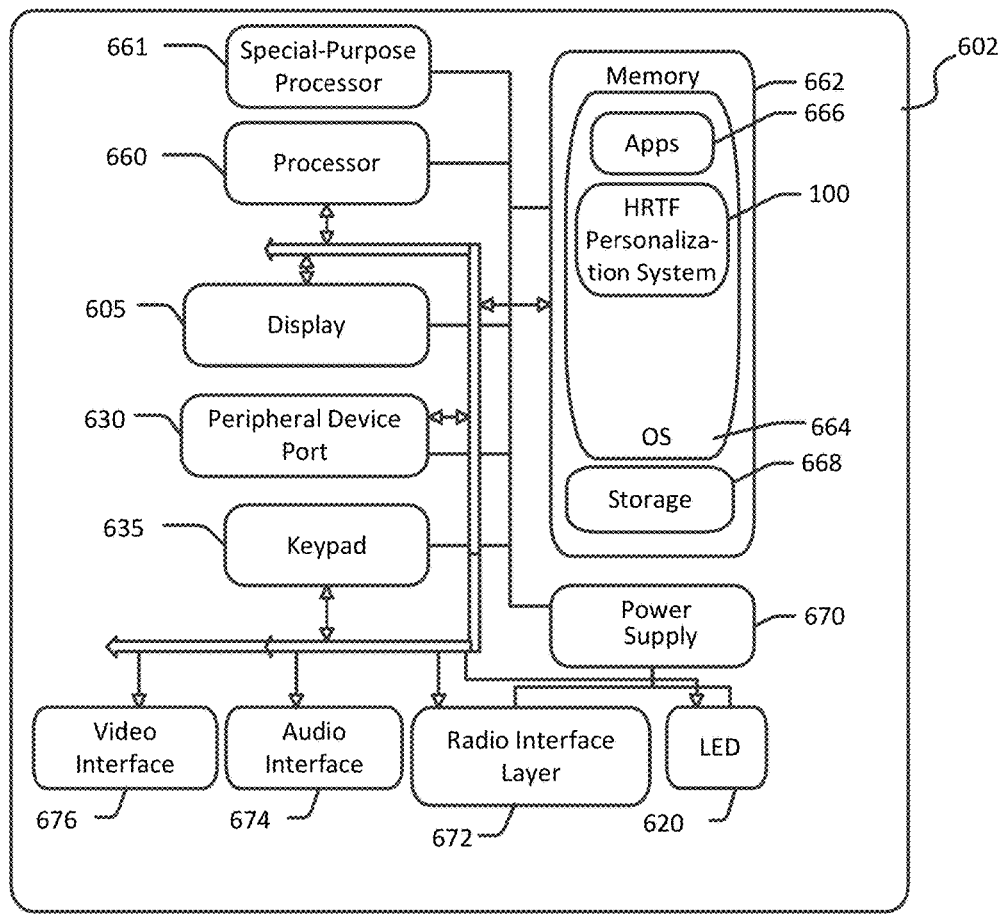
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the HRTF personalization system 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
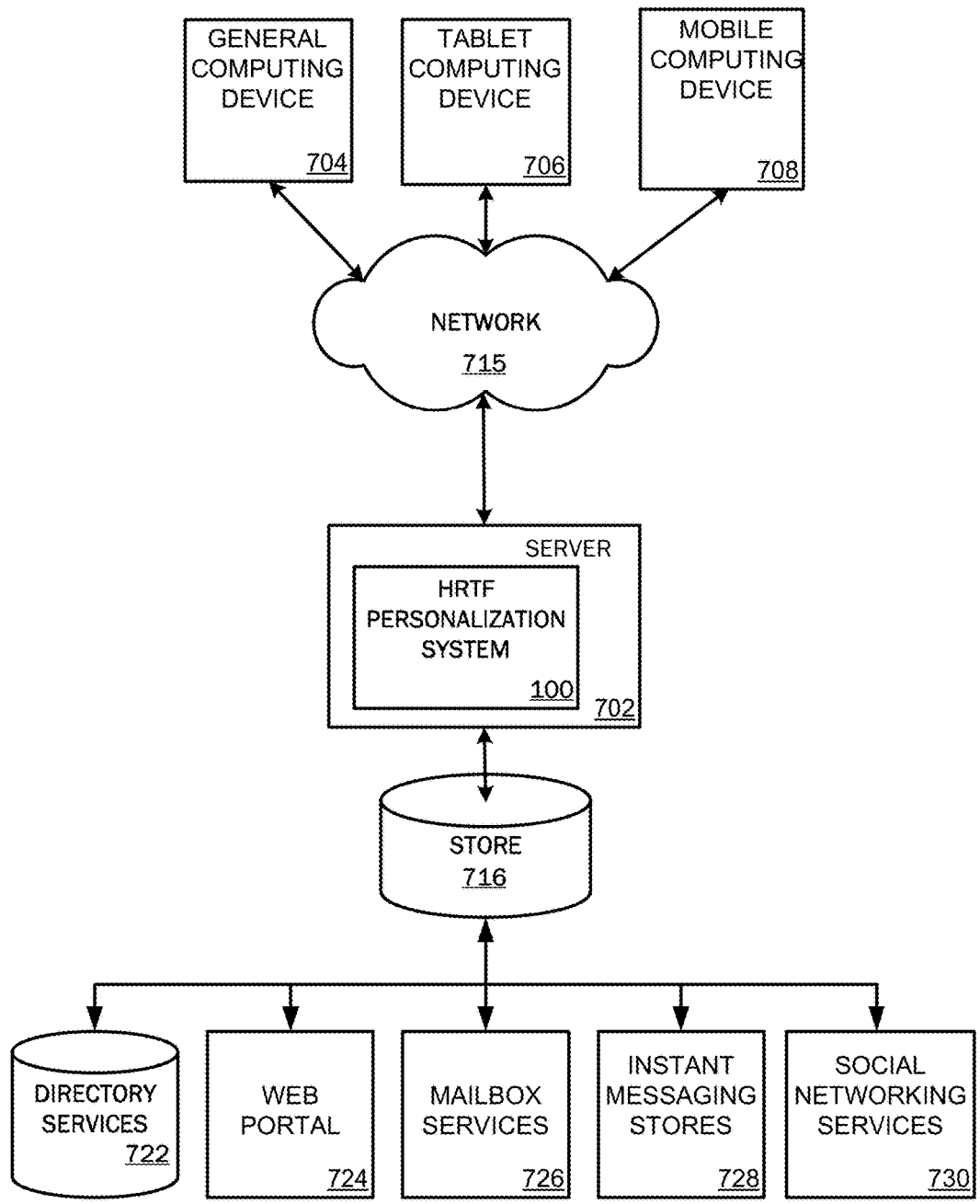
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the HRTF personalization system 100 may be implemented in a general computing device 704, a tablet computing device 706 and/or a mobile computing device 708 (e.g., a smart phone). In some aspects, the server 702 is configured to implement a HRTF personalization system 100, via the network 715 as illustrated in FIG. 7.

Figure 8:
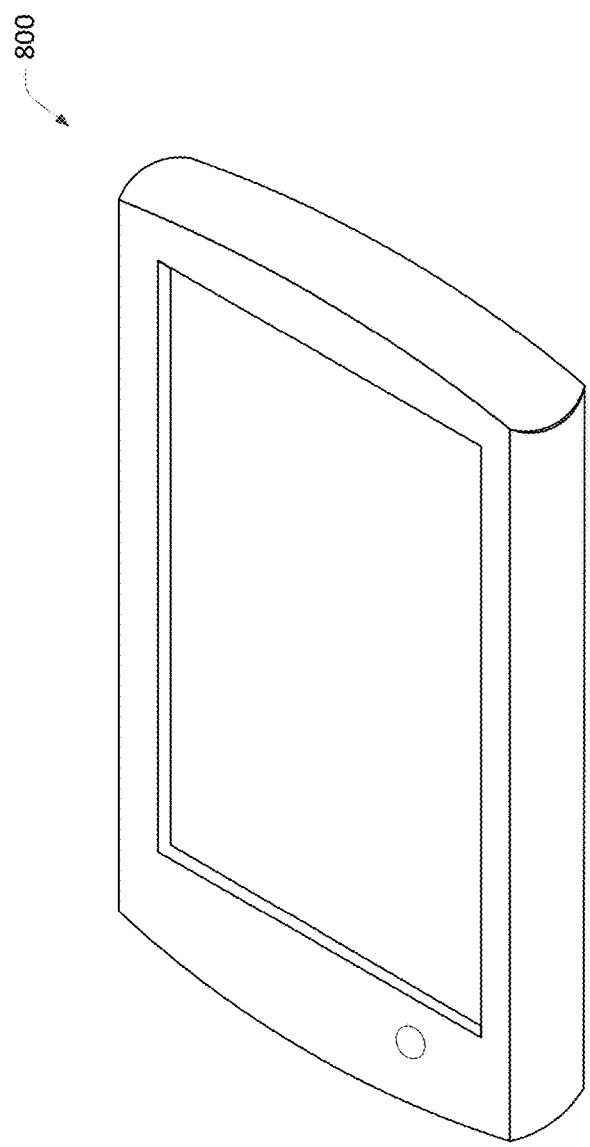
FIG. 8 illustrates a tablet computing device with which various aspects of the disclosure may be practiced.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

EXAMPLES

Example 1

In this example, a database of high-resolution 3D head scans from 262 training subjects is utilized to derive an averaged face template S. First, the scans are aligned so that the head is level, pointing forward, with the center of the interaural axis laying at the origin of the Cartesian coordinate system as illustrated by FIG. 3A. FIG. 3A is a high-resolution three-dimensional scan that illustrates 4096 uniformly distributed surface points (.) and 1583 face points (o), in accordance with aspects of the disclosure. In this example, using ray tracing, the vertices T of each 3D head scan are resampled to give $X_p = [x_0, x_1 \ldots x_p]$, the points of intersection between T and the normals of a cloud of points P uniformly distributed on the surface of a unit sphere, as illustrated by the black dots in FIG. 3A. Further in this example, a subset of G face points $F=[f_0, f_1 \ldots f_G] \subset X_p$ is selected that satisfies:

$$(\forall i \exists j) \frac{f_i}{\|f_i\|} \cdot \frac{v_j}{\|v_j\|} \geq 0.5, \qquad \text{EQ \#1}$$

where (.) denotes the dot product, and $V=[x_v, y_v, z_v]^T$ is a matrix of directions. Here, V is chose to roughly point to the front and cheeks of a 3D scan:

$$V = \begin{bmatrix} 1 & \cos(0.5) & \cos(-0.5) \\ 0 & \sin(0.5) & \sin(-0.5) \\ 0 & 0 & 0 \end{bmatrix}, \qquad \text{EQ \#2}$$

the green circles in FIG. 3A mark the selected face points. The base 3D face template $S=[s_0, s_1, \ldots s_L]$ is obtained by averaging the Cartesian coordinates of the face point sets of all M 3D head scans:

$$s_i = \frac{1}{M} \sum_{m=1}^{M} f_{i,m}. \qquad \text{EQ \#3}$$

The result of averaging the 262 scans is shown in FIG. 3B. FIG. 3B is a high-resolution three-dimensional scan illustrating a base three-dimensional face template generated based on 262 high-resolution 3D head scans of different test subjects, in accordance with aspects of the disclosure. From the base 3D template S, a subset of "cheek" points $C=[c_0, c_1 \ldots c_c]$ is obtained that satisfies:

$$(\forall i)|y_{c,i}>0.06|, \qquad \text{EQ \#4}$$

where $c_i=[x_{c,i}, y_{c,i}, z_{c,i}]$ and $y_{c,i}$ is given in meters. These cheek points, illustrated by blue circles in FIG. 3B, are used to estimate the deformation factor as the template is bent to match the face of user in a depth image as discussed below in EXAMPLE 2.

Example 2

In this example, distortion parameters for a modified 3D template $\hat{S}$ of the base 3D face template S from EXAMPLE 1 are calculated. A distortion parameter d is derived by comparing the y-coordinates of the subset C of the base 3D face template to the subset $\hat{C}$ in the modified 3D face template formed after matching or bending utilizing a non-rigid iterative closest point algorithm:

$$y_{\Delta,i} = y_{c,i} - y_{\hat{c},i}. \qquad \text{EQ \#5}$$

The deformation constant is given as:

$$d_\Delta = \text{median}(y_{\Delta,i}). \qquad \text{EQ \#6}$$

This simple measure for the template deformation was chosen for its robustness when applied to noisy depth images. The deformation factor d is mapped to the ITD scaling factor s via linear regression:

$$s = k_0 d + k_1. \qquad \text{EQ \#7}$$

Example 3

While this application is directed to a face depth image of the user, the systems and methods as disclosed herein would also work with 3D scans of the user. In this example, high-resolution 3D scans are used that contain both the user's fontal and side views, $y_w$ that can be calculated as:

$$y_{w,i} = \|C_{L,i} - C_{R,i}\|, \qquad \text{EQ \#8}$$

Where $C_L$ and $C_{R,i}$ are left and right check points, respectively. The deformation constant is given as:

$$d_w = \text{median}(y_{w,i}). \qquad \text{EQ \#9}$$

Example 4

In this example, an ITD scaling factor is calculated. The HRTF H(w) for a specific direction of arrival can be described in the frequency domain as:

$$H(w) = |H(w)| e^{-\varphi(w)},$$

Where w is the angular frequency, and $\varphi$ is the HRTF phase angle. For practical applications, the unwrapped phase angle $\varphi$ is often considered to be linear, i.e., the IDT $\tau$ is assumed to be frequency dependent:

$$\tau = t_L - t_R, \qquad \text{EQ \#10}$$

where, the $t_L$ and $t_R$ denote the time-of-arrival at the left and right ear entrance, respectively. While the measured ITDs do exhibit frequency dependence, experimental findings indicate this frequency dependence may not be perceptually relevant. The problem of personalizing the ITDs of generic HRTFs consists in mapping the listener's anthropometric features to the slope of the unwrapped phase angles $\varphi_L$ and $\varphi_R$.

Figure 2:
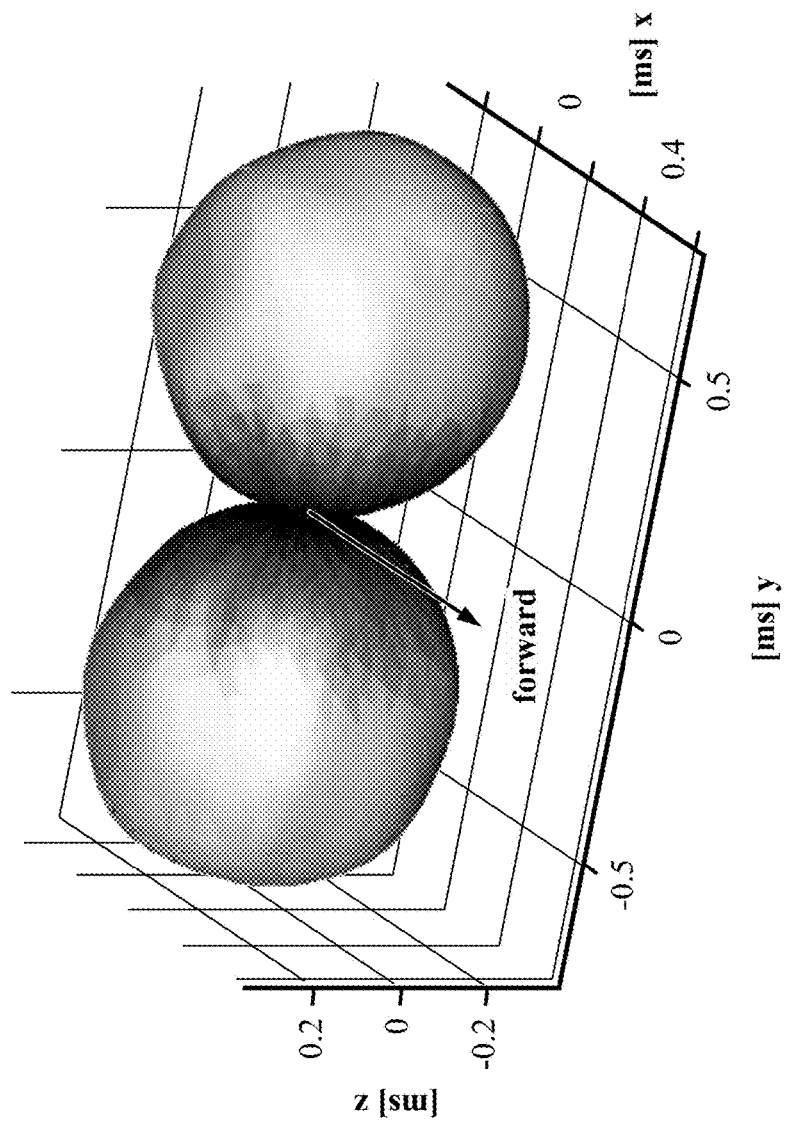
FIG. 2 is a graph illustrating an average interaural time delay contour of 262 test subjects measured at 400 locations and interpolated at 2048 Fliege points distributed uniformly on a sphere, in accordance with aspects of the disclosure.

Geometric ITD models are typically based on the assumption that a listener's ITD contour can be described with simple model, parameterized via a few anthropometric features, such as the head width and position of the ears. Here, a user average ITD contour $\overline{I}$ can be derived directly from measured HRTFs. The average ITD contour of 262 subjects, measured at 400 locations and interpolated at 2048 Filiege points distributed uniformly on the sphere is shown in FIG. 2. FIG. 2 is a graph illustrating an average interaural time delay contour of 262 test subjects measured at 400 locations and interpolated at 2048 Fliege points distributed uniformly on a sphere, in accordance with aspects of the disclosure. Given the true ITD contour I, derived from a subject's measured HRTF, the scaling factors is derived as follows:

$$s = \underset{s}{\text{argmin}} \, \text{argmin}_s \sum_{i=0}^{N-1} ((s\overline{I}_i + k) - I_i)^2, \qquad \text{EQ \#11}$$

where N is the number of measurements directions and k is an option bias term.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for head-related transfer function (HRTF) personalization, the system comprising:
   at least one processor; and
   a memory for storing and encoding computer executable instructions that, when executed by the at least one processor, are operative to:
   collect a generic set of HRTFs;
   collect a base three-dimensional face template;
   collect a depth image of a face of a user;
   bend the base three-dimensional face template until the base three-dimensional face template matches the face of the user in the depth image to form a modified three-dimensional face template;
   calculate distortion parameters between the base three-dimensional face template and the modified three-dimensional face template;
   adjust the generic set of HRTFs based on the distortion parameters to create a personalized set of HRTFs for the user; and
   generate three-dimensional sound for the user based on the personalized set of HRTFs for the user.

2. The system of claim 1, wherein the distortion parameters are mapped to HRTF features.

3. The system of claim 2, wherein the distortion parameters are mapped by a linear regression, using ground-truth measured HRTFs with corresponding three-dimensional head scans to the ground-truth measured HRTFs.

4. The system of claim 1, wherein the memory for storing and encoding the computer executable instructions that, when executed by the at least one processor are further operative to:
   provide the three-dimensional sound to the user,
   wherein the 3-dimensional sound is provided to the user via one or more speakers.

5. The system of claim 4, wherein the one or more speakers are head phones or ear buds.

6. The system of claim 1, wherein the depth image is a single depth image.

7. The system of claim 1, wherein adjust the generic set of HRTFs based on the distortion parameters to create the personalized set of HRTFs for the user comprises:
   adjust interaural time differences of the generic set of HRTFs.

8. The system of claim 1, wherein calculate the distortion parameters between the base three-dimensional face template and the modified three-dimensional face template comprises:
   calculate a distortion between each face point on the base three-dimensional face template and the modified three-dimensional face template.

9. A method for head related transfer function (HRTF) personalization, the method comprising:
collecting a generic set of HRTFs;
collecting a base three-dimensional face template;
collecting a depth image of a face of a user;
bending the base three-dimensional face template until the base three-dimensional face template matches the face of the user in the depth image to form a modified three-dimensional face template;
calculating distortion parameters between the base three-dimensional face template and the modified three-dimensional face template;
adjusting the generic set of HRTFs based on the distortion parameters to obtain a personalized set of HRTFs for the user; and
generating three-dimensional sound for the user based at least on the personalized set of HRTFs for the user.

10. The method of claim 9, wherein the distortion parameters are mapped to HRTF features.

11. The method of claim 10, wherein the distortion parameters are mapped by a linear regression, using ground-truth measured HRTFs with corresponding three-dimensional head scans to the ground-truth measured HRTFs.

12. The method of claim 9, wherein collecting the depth image of the face of the user comprises:
taking the depth image of the face of the user.

13. The method of claim 9, further comprising:
providing the three-dimensional sound to the user,
wherein the 3-dimensional sound is provided to the user via one or more speakers.

14. The method of claim 9, wherein the depth image is a single depth image.

15. The method of claim 9, wherein adjusting the generic set of HRTFs based on the distortion parameters to create the personalized set of HRTFs for the user comprises:
adjusting interaural time differences of the generic set of HRTFs.

16. The method of claim 9, wherein calculating distortion parameters between the base three-dimensional face template and the modified three-dimensional face template comprises:
calculating a difference between each y-coordinate of a face point on the base three-dimensional face template and on the modified three-dimensional face template.

17. A system for head related transfer function (HRTF) personalization, the system comprising:
a computing device including a processing unit and a memory, the computing device is operable to:
bend a base three-dimensional face template until the base three-dimensional face template matches a face of a user in a depth image to form a modified three-dimensional face template;
calculate one or more distortion parameters between the base three-dimensional face template and the modified three-dimensional face template; and
adjust a generic set of HRTFs based on the one or more distortion parameters to create a personalized set of HRTFs for the user.

18. The system of claim 17, wherein the computing device is further operable to:
generate three-dimensional sound for the user based at least on the personalized set of HRTFs for the user; and
provide the three-dimensional sound to the user.

19. The system of claim 17, wherein the computing device is further operable to:
take the depth image of the face of the user.

20. The system of claim 17, wherein the distortion parameters are mapped to HRTF features,
wherein the distortion parameters are mapped by a linear regression, using a database of ground-truth measured HRTFs.

* * * * *